Feb. 9, 1954

C. F. HARMON 2,668,719

MILLING ATTACHMENT FOR LATHE

Filed Oct. 6, 1950

INVENTOR.
CHARLES F. HARMON,
BY
ATTORNEYS.

Feb. 9, 1954  C. F. HARMON  2,668,719
MILLING ATTACHMENT FOR LATHE
Filed Oct. 6, 1950  2 Sheets-Sheet 2
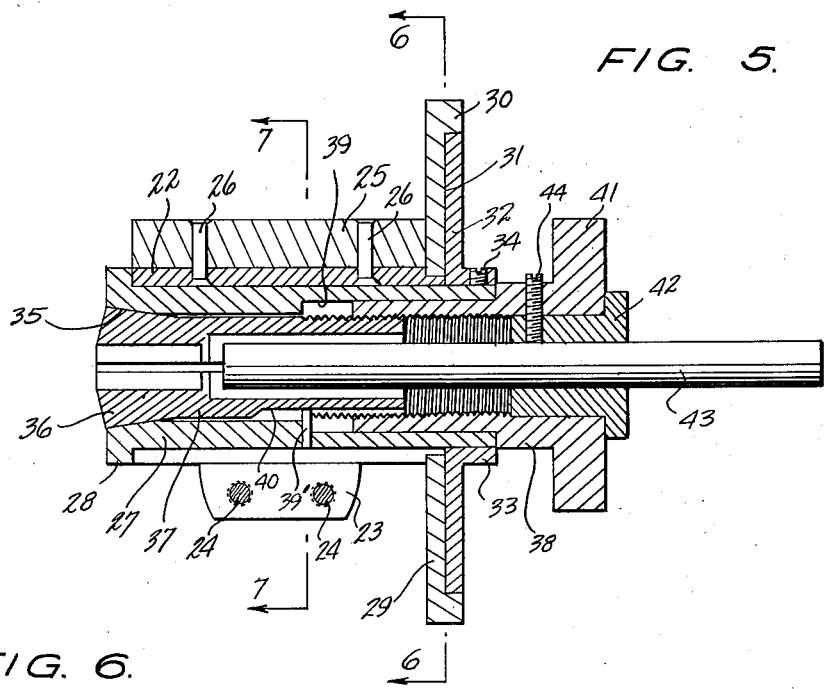
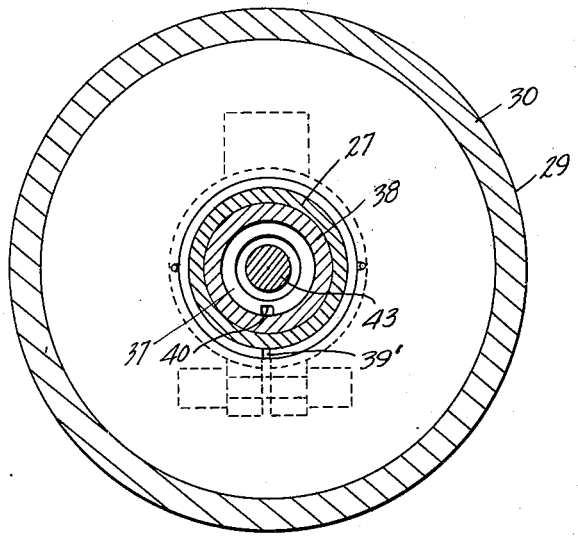
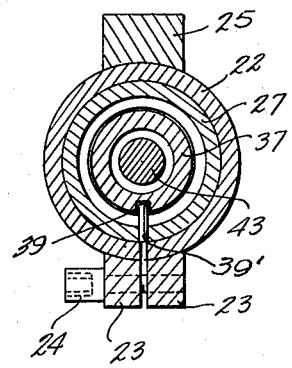
INVENTOR.
CHARLES F. HARMON,
BY
ATTORNEYS.

Patented Feb. 9, 1954

2,668,719

UNITED STATES PATENT OFFICE 2,668,719

MILLING ATTACHMENT FOR LATHE

Charles F. Harmon, Shawnee, Okla.

Application October 6, 1950, Serial No. 188,764

2 Claims. (Cl. 279—5)

This invention relates to lathe milling attachments, and more particularly to an improved, rotatably adjustable work holder for use with a lathe milling attachment.

A main object of the invention is to provide a novel and improved, rotatably adjustable work holder for use with a conventional lathe milling attachment, said work holder being very simple in construction, being easy to install in the milling attachment, and being easy to adjust, whereby the work may be oriented at a desired angle relative to the milling cutter.

A further object of the invention is to provide an improved work-holding attachment for use in a conventional lathe milling fixture, said attachment being very inexpensive to manufacture, involving only a few parts, being sturdy in construction, and providing means for accurately setting up a work piece with respect to the milling cutter.

Further objects and advantages of the invention will become apparent from the following description and claims, and from the accompanying drawings, wherein:

Figure 5 is an enlarged cross-sectional detail view taken on line 5—5 of Figure 2;

Figure 6 is a cross-sectional view taken on line 6—6 of Figure 5;

Figure 7 is a cross-sectional view taken on line 7—7 of Figure 5.

Figure 1:
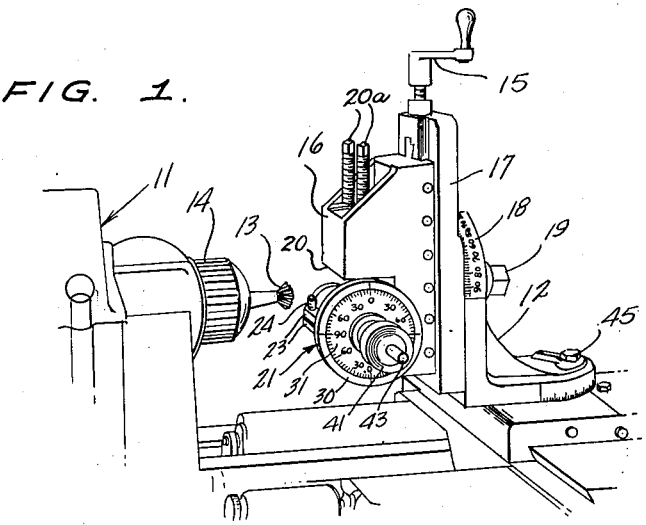
Figure 1 is a perspective view of a portion of a lathe equipped with a conventional milling attachment, said attachment being provided with an improved, rotatably adjustable work-holding fixture constructed in accordance with the present invention.
Figure 2:
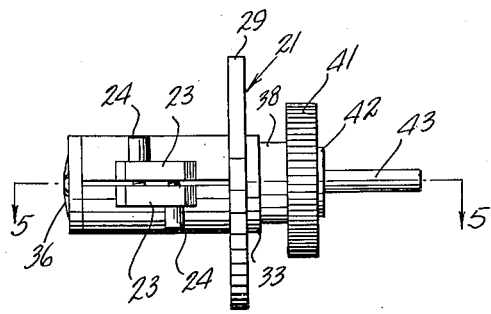
Figure 2 is a side elevational view of the improved work-holding fixture employed in Figure 1.

Referring to the drawings, 11 generally designates a lathe, and 12 designates a conventional milling attachment which is mounted on the compound rest base of the lathe in a manner which allows the cross feed and longitudinal feed of the lathe to be employed for regulating the position of the milling attachment transversely and longitudinally relative to a milling cutter 13 secured in the chuck 14. The attachment 12 is provided with a hand crank 15 secured to a vertical adjusting screw, whereby the gripping portion 16 of the attachment may be adjusted vertically and is further provided with means for swiveling the body 17 of the attachment around a longitudinal, horizontal axis and for clamping said body in adjusted position around said longitudinal, horizontal axis, a calibrated angle plate 18 being provided which is mounted on the base portion of the attachment, the angular position of the body 17 being determined with reference to the angle plate 18. Designated at 19 is the squared end of a clamping member adapted to clamp the body 17 in an adjusted angular position around said longitudinal, horizontal axis.

The gripping member 16 is provided with a notch or recess 20 adapted to receive the work to be milled, said gripping member being further provided with clamping screws 20a, 20a clampingly engageable with the work positioned in the recess 20.

It will be readily apparent that although the work-gripping member 16 is adjustable transversely, longitudinally, vertically, and angularly around a longitudinal, horizontal axis, said member 16 is not adjustable around a transverse, horizontal axis. This means that if a piece is to be milled at different angles around a transverse, horizontal axis, the piece must be reset in the gripping member 16 each time that its position around said horizontal, transverse axis is changed. The fixture of the present invention eliminates the necessity of resetting the work each time the work angle, with respect to a horizontal, transverse axis, is varied. In Figure 1, 21 generally designates the improved work-holding fixture provided in the notch or recess 20 in accordance with the present invention to provide adjustability of the work piece around a horizontal, transverse axis.

Figure 4:
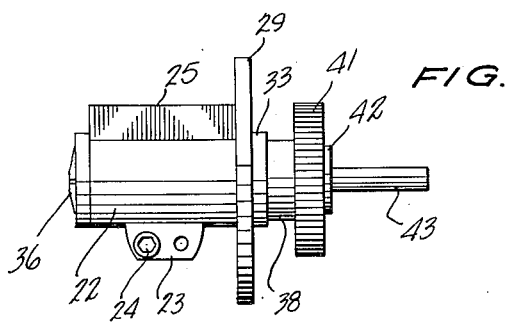
Figure 4 is a top plan view of the work-holding fixture of Figure 2.

The fixture 21 comprises a main clamping sleeve 22 which is generally C-shaped in cross-section and which is provided at its ends with the opposing flanges 23, 23. Designated at 24, 24 are respective Allen-head clamping screws extending through the respective flanges 23 and threadedly engaged with the opposing flange. Designated at 25 is an anvil block secured longitudinally to the clamping sleeve 22, as by rivets 26, 26, and located opposite the flanges 23, 23, as shown in Figures 4 and 5. The anvil block 25 is adapted to be received inside the notch or recess 20 of the body 16 of the milling attachment 12, and to be clamped in the body 16 by the clamping screws 20a of the milling attachment. When thus clamped, the axis of the sleeve 22 extends transversely and horizontally with respect to the bed of the lathe 11.

Figure 3:
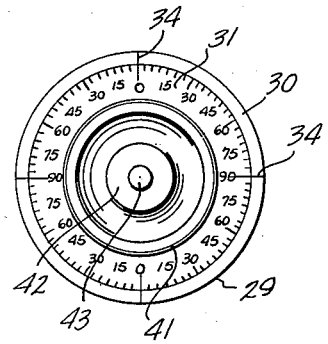
Figure 3 is an end elevational view of the work-holding fixture of Figure 2.

Designated at 27 is an inner sleeve which is positioned inside the clamping sleeve 22 and which is rotatably adjustable within said sleeve. The inner sleeve 27 may be rotated inside the sleeve 22 by loosening the clamping screws 24, 24. When said clamping screws are tightened, the sleeve 27 is locked in adjusted position inside the clamping sleeve 22. The inner sleeve 27 is formed at one end with an annular flange 28 which abuts the end of the clamping sleeve 22 and limits movement of the inner sleeve 27 to the right, as viewed in Figure 5. Secured to the left end portion of the clamping sleeve 22 is an annular disc 29 formed with a peripheral flange 30 defining a circular recess 31. Designated at 32 is an annular disc member formed with a sleeve portion 33 which is mounted on the right end of the inner sleeve 27, as viewed in Figure 5, and which is secured thereto by a set screw 34. The disc member 31 is engraved at its periphery with angle scales, as shown in Figure 3, and the peripheral flange 30 of the disc member 29 is formed with radial index marks 34 spaced at 90-degree intervals, as shown in Figure 3. As shown in Figure 3, the scales on the disc member 31 are from zero to 90°, and alternate in sequence, each 90-degree scale being reversed in direction as compared with the adjacent 90-degree scale.

The left end portion of the inner sleeve 27 is flared at its interior surface, as shown at 35, and wedgingly receives the flared portion 36 of a conventional lathe collet 37. Designated at 38 is a shouldered, tubular member which is rotatably received inside the enlarged bore portion 39 of the inner sleeve 37, as shown in Figure 5, and which threadedly engages the end portion of the collet sleeve 37. Designated at 39' is a radial pin member which is secured in the wall of the inner sleeve 27 and which projects into a longitudinal keyway 40 formed in the collet sleeve 37. The right end of the tubular member 38 is formed with an annular knob portion 41, as viewed in Figure 5, whereby the sleeve member 38 may be rotated, and whereby the collet sleeve 37 may be moved longitudinally in the sleeve 27. Secured axially in the end of the sleeve member 38 is a bushing 42, and extending axially through said bushing is a stop rod 43 which may be secured in longitudinally adjusted position inside the sleeve 38 by a set screw 44 threaded through the sleeve 38 and the bushing 42, as shown in Figure 5. The stop rod 43 is employed to regulate the position of the shank of the work piece gripped in the collet 37.

With the work piece held in the fixture 21, and the fixture held in the gripping portion 16 of the milling attachment, the angular position around a transverse horizontal axis of a work piece held in the collet 37 may be changed by loosening the clamping screws 24, 24, rotating the work piece until the calibrated angle plate 31 has been rotated through the desired angle of change, and then re-tightening the clamping screws 24, 24. This enables the work piece to be rotated around a horizontal, transverse axis in a rapid and convenient manner and without requiring the clamping screws 21, 21 of the gripping portion of the milling attachment to be loosened.

It will be readily apparent that by employing the improved work-holding fixture above described, milling operations on a work piece may be performed in a very accurate manner at different positions on the work piece around a transverse, horizontal axis with respect to the lathe. Furthermore, by rotating the attachment 12 around the vertical axis of adjustment, namely, around the axis of the clamping screw shown at 45 in Figure 1, the milling attachment may be set so that the axis of the work-holding collet is parallel to the axis of the lathe spindle. With the device arranged in this manner, holes may be drilled in a work piece at various desired angles around the axis of the work-holding collet, said angles being set by employing the angle scale 31 to establish the angles in the manner above described. It will also be apparent that holes may be drilled in a work piece at evenly spaced angles on a given circle with a high degree of accuracy by employing the device as thus described.

While a specific embodiment of an improved work-holding attachment for use in a lathe milling fixture has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A rotatably adjustable work holder of the character described comprising a clamping sleeve having respective longitudinal marginal flanges and clamping screws connecting said flanges and arranged to exert clamping tension on the flanges, a longitudinal anvil bar rigidly secured to said clamping sleeve diametrically opposite said flanges, said anvil bar being adapted to be grippingly received in a lathe milling attachment, an inner sleeve received inside said clamping sleeve and rotatably adjustable therein, a tubular chuck wedgingly positioned in one end portion of said inner sleeve, cooperating longitudinally extending key means carried by said inner sleeve and tubular chuck restraining said chuck against rotation relative to said inner sleeve, said key means allowing longitudinal movement of the chuck, a tubular knob member rotatably received in the other end portion of said inner sleeve and threadedly engaged with said tubular chuck, and an axial stop rod slidably received in and extending through said knob member, said stop rod extending axially into said tubular chuck, and means on said knob member clampingly engaging said stop rod, and cooperating index means on said clamping sleeve and said inner sleeve.

2. A rotatably adjustable work holder of the character described comprising a clamping sleeve having respective longitudinal marginal flanges and clamping screws connecting said flanges and arranged to exert clamping tension on the flanges, a longitudinal anvil bar rigidly secured to said clamping sleeve diametrically opposite said flanges, said anvil bar being adapted to be grippingly received in a lathe milling attachment, an inner sleeve received inside said clamping sleeve and rotatably adjustable therein, a tubular chuck wedgingly positioned in one end portion of said inner sleeve, cooperating longitudinally extending key means carried by said inner sleeve and tubular chuck restraining said chuck against rotation relative to said inner sleeve but allowing longitudinal movement of the chuck, a tubular knob member rotatably received in the other end portion of said inner sleeve and threadedly engaged with said tubular chuck, an axial stop rod slidably received in and extending through said knob member, said stop rod extending axially into said tubular chuck, means on said knob member clampingly engaging said stop rod, an annular index plate member secured to said clamping sleeve concentrically therewith, and an angular calibrated annular disc member secured to said inner sleeve adjacent said index plate member.

CHARLES F. HARMON.

References Cited in the file of this patent

UNITED STATES PATENTS

| Number | Name | Date |
|---|---|---|
| 600,747 | Severson | Mar. 15, 1898 |
| 1,260,130 | Bemis | Mar. 19, 1918 |
| 1,273,417 | Smith | July 23, 1918 |
| 2,520,518 | Thompson | Aug. 29, 1950 |

FOREIGN PATENTS

| Number | Country | Date |
|---|---|---|
| 610,770 | Great Britain | Oct. 20, 1948 |
| 627,016 | Great Britain | July 26, 1949 |